United States Patent
Chafle et al.

(10) Patent No.: US 10,628,250 B2
(45) Date of Patent: Apr. 21, 2020

(54) SEARCH FOR INFORMATION RELATED TO AN INCIDENT

(71) Applicant: International Business Machines Corporation, Armonk, NY (US)

(72) Inventors: Girish B. Chafle, Pune (IN); Qi Cheng Li, Beijing (CN); Shao Chun Li, Beijing (CN); Anindya Neogi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 14/847,106

(22) Filed: Sep. 8, 2015

(65) Prior Publication Data

US 2017/0068721 A1    Mar. 9, 2017

(51) Int. Cl.
G06F 11/07 (2006.01)
G06F 11/00 (2006.01)

(52) U.S. Cl.
CPC ............ G06F 11/079 (2013.01); G06F 11/00 (2013.01); G06F 11/0709 (2013.01)

(58) Field of Classification Search
CPC ......... G06F 17/30598; G06F 17/30705; G06F 17/30477; G06F 17/30528; G06F 11/0709; G06F 11/079
USPC ....................................................... 707/738
See application file for complete search history.

(56) References Cited

U.S. PATENT DOCUMENTS

| | | | | |
|---|---|---|---|---|
| 7,617,190 B2 * | 11/2009 | Wright | ............... | G06F 17/30489 |
| 8,909,622 B1 * | 12/2014 | Emigh | .................. | H04L 41/069 |
| | | | | 707/722 |
| 9,299,031 B2 * | 3/2016 | Jan | .......................... | G06N 5/048 |
| 2009/0055684 A1 | 2/2009 | Jamjoom et al. | | |
| 2009/0313219 A1 * | 12/2009 | Gupta | ..................... | G06Q 10/10 |
| 2010/0318847 A1 * | 12/2010 | Beg | ..................... | G05B 23/0243 |
| | | | | 714/26 |
| 2011/0145383 A1 * | 6/2011 | Bishop | .................. | H04L 41/065 |
| | | | | 709/223 |
| 2012/0066547 A1 * | 3/2012 | Gilbert | .................. | H04L 41/065 |
| | | | | 714/26 |

(Continued)

OTHER PUBLICATIONS

Liu, et al., "IT Incident Management by Analyzing Incident Relations", C. Liu et al. (Eds.): ICSOC 2012, LNCS 7636, pp. 631-638, 2012, © Springer-Verlag Berlin Heidelberg 2012.

(Continued)

*Primary Examiner* — Robert W Beausoliel, Jr.
*Assistant Examiner* — Arthur Ganger
(74) *Attorney, Agent, or Firm* — David B. Woycechowsky (57) ABSTRACT

Computer-implemented method for searching for information related to an incident generated in a server system, a system and a computer program product. The method includes extracting context information from a current ticket describing the incident, the context information including a first expression describing a symptom of the incident and indicating at least one component of the server system associated with the symptom; determining a data source which generates data in which the information related to the incident is to be searched for at least according to the at least one component; and using the first expression describing the symptom and a second different expression describing the symptom as keywords to search for the information related to the incident in the data.

6 Claims, 4 Drawing Sheets

| Ticket | Component or symptom | | | | | | | Similarity degree | result |
|---|---|---|---|---|---|---|---|---|---|
| | SomeApp | Server xyz | Server xyz2 | Server xyz3 | MQ | WAS | MQ connectivity lost | Web error | | |
| T1 | X | X | X | | X | | X | | | |
| TH1 | X | X | | | X | X | X | | 0.8 | Similar |
| TH2 | X | | X | X | | X | X | | 0.6 | Similar |
| TH3 | | X | | X | | | | X | 0.26 | Not similar |

* "X" represents that the component or symptom is indicated in the ticket (56) References Cited

U.S. PATENT DOCUMENTS

| | | | | |
|---|---|---|---|---|
| 2012/0239681 | A1* | 9/2012 | Zhang | G06F 17/30486 |
| | | | | 707/769 |
| 2013/0282725 | A1 | 10/2013 | Rubinger | |
| 2014/0129536 | A1* | 5/2014 | Anand | G06Q 10/0635 |
| | | | | 707/706 |
| 2017/0083390 | A1* | 3/2017 | Talwadker | G06F 11/079 |

OTHER PUBLICATIONS

Schroeck et al., "Analytics: The real-world use of big data", IBM Global Business Services, Business Analytics and Optimization, IBM Institute for Business Value, Said Business School at the University of Oxford, Executive Report, pp. 1-20, Produced in the United States, Oct. 2012.

Zawawy, et al., "Log Filtering and Interpretation for Root Cause Analysis", 26th IEEE International Conference on Software Maintenance in Timiloara, Romania, Sep. 12-18, 2010, pp. 1-5, DOI: 10.1109/ICSM.2010.5609556.

\* cited by examiner

| INCIDENT_ID: IN1 | |
|---|---|
| Severity : 1 | Open Time: 2014-12-9 15:03 |
| Assignee: Joe | Support Team: Web Application Team |
| Description: Application A2 is down on middleware WAS. | |

| Ticket | Component or symptom | | | | | | | Similarity degree | result |
|---|---|---|---|---|---|---|---|---|---|
| | SomeApp | Server xyz | Server xyz2 | Server xyz3 | MQ | WAS | MQ connectivity lost | Web error | | |
| T1 | X | X | X | | X | | X | | | |
| TH1 | X | X | | | X | X | X | | 0.8 | Similar |
| TH2 | X | | X | X | | X | X | | 0.6 | Similar |
| TH3 | | X | | X | | | | X | 0.26 | Not similar |

* "X" represents that the component or symptom is indicated in the ticket

SEARCH FOR INFORMATION RELATED TO AN INCIDENT

BACKGROUND

The present disclosure relates to an information search, and more specifically, to a computer-implemented method, a system and a computer program product for searching for information related to an incident generated in a server system.

A server system typically includes components including a server, middleware deployed on the server, and an application, installed in the middleware that provides a service. During an operation of the server system, machine data, such as logs, events, configurations, etc. are generated by one or more of the following components of the server system: the server, the middleware and/or the application. Typically, when an incident occurs in the server system during its operation, a ticket describing the incident is generated: (i) manually by, for example, an administrator of the system; and/or (ii) automatically by the server system. The ticket typically indicates symptom(s) of the incident, so that the nature and/or cause(s) of the incident can be determined from the ticket.

Major work in maintenance of the server system is often required when an incident occurs and causes service to stop. This work typically involves: (i) locating a cause resulting in the incident, (ii) then eliminating the cause, and (iii) recover the services provided by the server system.

SUMMARY

According to an aspect of the present invention, there is a method, computer program product and/or system for use in connection with an incident generated in a server system that performs the following operations (not necessarily in the following order): (i) extracting context information from a current ticket describing the incident, the context information including: a set of ticket-indicated component(s) indicated by the context information, and a first expression describing a symptom; (ii) determining, based at least in part upon the set of ticket-indicated component(s), a set of ticket-indicated machine data source(s) which generate, automatically by machine logic, a respectively corresponding set of ticket-indicated log(s); and (iii) using the first expression as a first set of keyword(s) to, automatically by machine logic, search the set of ticket-indicated log(s) to determine relevant information related to the incident.

DETAILED DESCRIPTION

Some embodiments of the present invention may include one, or more, of the following features, characteristics and/or advantages: (i) locate the cause of an incident effectively and quickly; (ii) recover the service as soon as possible; (iii) render unnecessary manual collection, manual indexing and manual analysis of: (a) the ticket, and (b) the machine data generated by the server, the middleware and the application; (iv) effective for relatively complex server systems with a relatively large number of the components included in the system and a correspondingly huge amount of machine data typically generated when an incident occurs; and/or (v) effective in situations where there is not enough context information for machine data, from the various complex server system components, to be linked to each other, where it is typically difficult to manually find the information related to the incident quickly and effectively and locate the cause efficiently.

According to an embodiment of the present disclosure, there is provided a computer-implemented method, system and/or computer program product for searching for information related to an incident generated in a server system. Context information is extracted from a ticket describing the incident, and the context information includes a first expression describing a symptom of the incident and indicating at least one component (sometimes herein referred to as a "set of ticket-indicated component(s)") of the server system associated with the symptom. A data source is determined based on the set of indicated component(s). Data generated by the data source is searched, for relevant information regarding the incident, using keywords corresponding to the following: (i) the first expression describing the symptom, and (ii) a second expression, different than the first expression, describing the symptom.

According to another embodiment of the present disclosure, there is provided a computer program product for searching for information related to an incident generated in a server system. The computer program product includes a computer readable storage medium having thereon first program instructions, second program instructions and third program instructions. The first program instructions are executable by a processor to cause the processor to extract context information from a current ticket describing the incident, the context information including a first expression describing a symptom of the incident and indicating at least one component of the server system associated with the symptom. The second program instructions are executable by the processor to cause the processor to determine a data source which generates data in which the information related to the incident is to be searched for at least according to the at least one component. The third program instructions are executable by the processor to cause the processor to use the first expression describing the symptom and a second different expression describing the symptom as keywords to search for the information related to the incident in the data.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
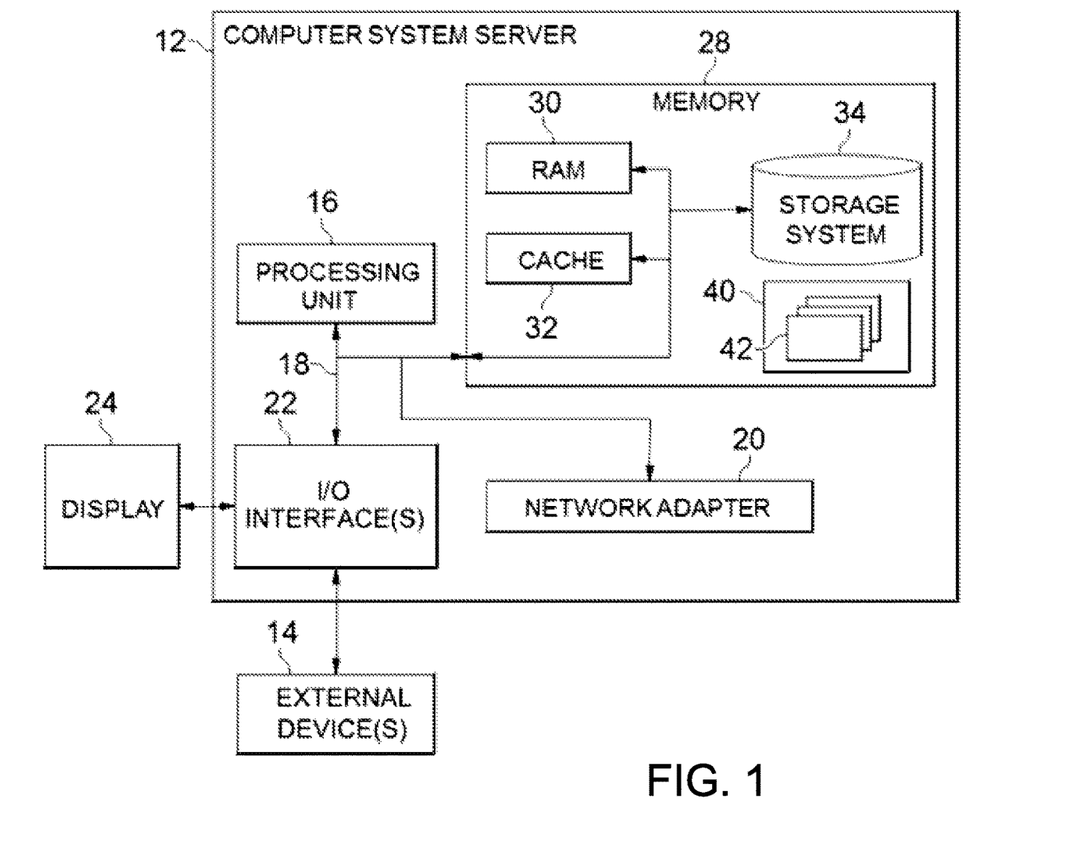
FIG. 1 shows a computer system which is applicable to implement the embodiments of the present invention.

Referring now to FIG. 1, in which a computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (for example, network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

A server (or a computer system) described above may be configured with a middleware and an application, forming a server system. Specifically, the middleware may be deployed on the server, and the application may be installed in the middleware, so that the server system includes the server, the middleware and the application as its components. There may be one or more servers, one or more middleware and one or more applications in a server system according to actual needs. Additionally, the server may be a physical machine so that the middleware is deployed on the physical machine, or may be a physical machine plus a virtual machine, in which case the middleware is deployed on the virtual machine.

After the configuration of the server system is completed, the components included in the server system, (that is, the server, the middleware and the application), and the relationship among the components are known. The relationships among the components may, for example, include: (i) a relationship where one component contains another component, or (ii) a first component is installed/deployed on a second component, etc. A topology of the server system may be determined according to the relationship among the components. This topology may be stored for subsequent use. For example, the list of the components may be stored in a configuration management database (CMDB) and may act as a dictionary from which related information, such as names, configurations, functions and the like, of the respective components may be retrieved when needed. The relationship among the components may also be recorded in the CMDB together with the list of the components in any suitable machine readable manner.

During an operation of the server system, the server, the middleware, and the application included in the server system act as machine data sources which generate various machine data, such as logs, events, configurations, or the like. The machine data may be a set of records, each of which includes a set of attributes. For example, a log may include attributes such as a timestamp indicating a time at which the log is generated, a thread ID, severity, a message identifier, a component ID indicating a component which generates the log, etc., and an event may include a timestamp indicating a time at which the event occurs, a name of a server at which the event occurs, a priority of the event, severity, etc. Based on the topology of the server system, the machine data sources may be organized into a machine data model, which may reflect the machine data sources included in the server system and their relationship.

Figure 2:
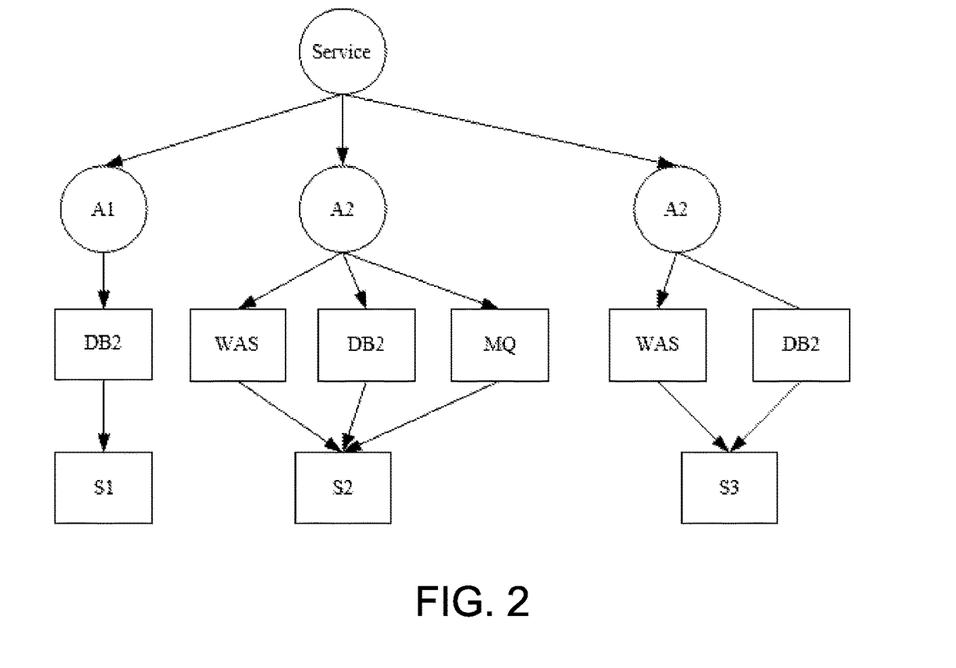
FIG. 2 shows a server in which embodiments of the present disclosure may be applied.

FIG. 2 shows an example of a machine data model for a server system. In the server system, an application A1 is installed in a middleware WAS and DB2 deployed on a server S1, an application A2 is installed in three middleware WAS, DB2 and MQ deployed on a server S2, an application A2 is installed in two middleware WAS and DB2 deployed on a server S3, and the three applications provide a service. Accordingly, in the machine data model shown in FIG. 2, the application A1 is linked to the middleware DB2, which, in turn, is linked to the server S1 in a first branch. The application A2 is linked to the middleware WAS, DB2 and MQ, which, in turn, are linked to the server S2 in a second branch. The application A2 is linked to the middleware WAS and DB2, which, in turn, are linked to the server S3 in a third branch. The three applications in the three branches are linked to the service.

Figure 3:
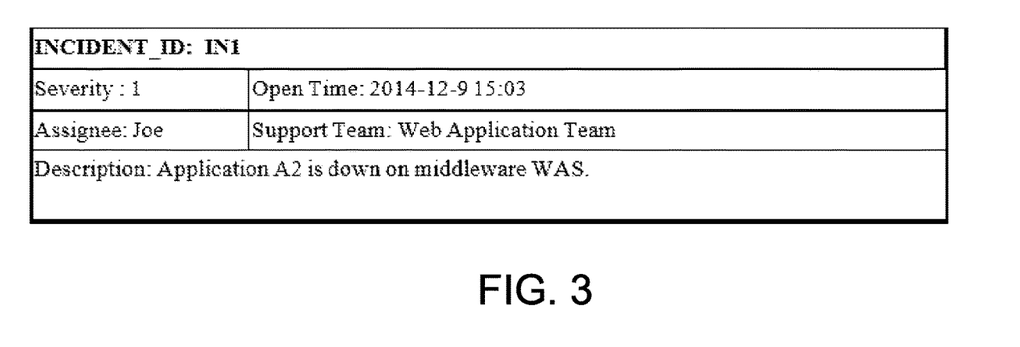
FIG. 3 shows a ticket for an incident generated in the server system shown in FIG. 2.

As described above, when an incident occurs in the server system during an operation of the system, a ticket describing the incident is generated, where the ticket may be generated manually by, for example, an administrator of the system, or automatically by the server system. The ticket may include basic information of the incident and context information of the incident. The basic information may be provided in a structured language, and may include at least one of an ID of the ticket, a time at which the ticket is generated, severity of the incident, an owner of the ticket, and the like. The context information may be provided in an unstructured language, such as in a natural language, and may include an expression (for example a word, a phrase or a sentence) describing a symptom of the incident and indicate at least one component associated with the symptom, such as a server, a middleware or an application where the symptom occurs or is considered to have occurred. The expression describing the symptom may have a predetermined format. For example, the expression describing the symptom may be a combination of a name and a descriptive word, where: (i) the name is a name of the component associated with the symptom, such as "A1" or "application A1", "DB2" or "middlewareDB2", or "S1" or "server S1" shown in FIG. 2; and (ii) the descriptive word may be a word describing various abnormal status or events, such as "down", "not available/unavailable" or "lost". FIG. 3 shows a ticket for an incident generated in the server system shown in FIG. 2. The ticket includes basic information including an incident ID "IN1", severity "1", a time at which the ticket is generated "2014-12-9 15:03", an assignee "Joe", and a support team "Web Application Team". The ticket of FIG. 3 further includes context information including an expression indicating a symptom "Application A2 is down on middleware WAS", where the context information indicates components associated with the symptom "Application A2" and "middleware WAS". It is to be appreciated that the ticket may adopt other suitable form than that shown in FIG. 3, and the content of the ticket may also vary according to actual needs.

After an incident occurs, it may be helpful to find information related to the incident in the machine data generated by the components included in the server system quickly, so as to locate and eliminate a cause for the incident as soon as possible. This can be accomplished by the embodiment of the present disclosure described below. As described above, the machine data may include logs, events and/or configurations, etc. In the embodiment of the invention to be described, below, in connection with FIG. 4, the machine data used by the embodiment will be limited to logs for the sake of simplicity of description.

With reference now to the accompanying drawings, a computer-implemented method and a device for searching for information related to an incident generated in a server system, and a system and a computer program product for searching for information related to an incident generated in a server system according to embodiments of the present disclosure will be described in detail.

The computer-implemented method for searching for information related to an incident according to an embodiment of the present disclosure will be described below with reference to FIG. 4.

Figure 4:
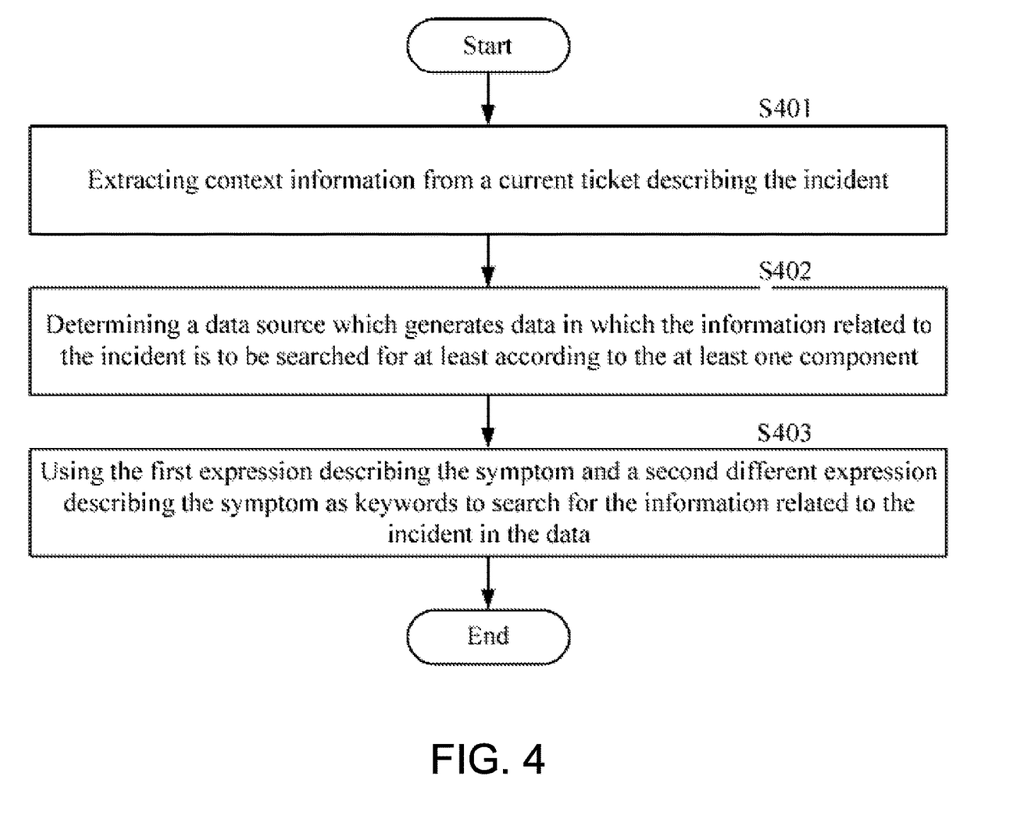
FIG. 4 shows a flow diagram for a computer-implemented method for searching for information related to an incident according to an embodiment of the present disclosure.

As shown in FIG. 4, in step S401, context information (herein also sometimes referred to as "ticket information" or "ticket text information") is extracted from a ticket describing the incident (hereinafter sometimes referred to as the "current ticket"). As described above, the context information may include a "first expression" which describe symptoms symptom(s) of the incident. The first expression will typically indicate a set of component(s) of the server system associated with the symptom. Herein, this set of component(s) may be referred to as: (i) a "set of first-expression-indicated component(s)" because the names of these component(s) are included in the first expression; and/or (ii) a "set of ticket-indicated component(s)" because these component(s) are included in the context information (of which the first expression is a part). The set of first-expression-indicated component(s) may be one of a server, a middleware and an application included in the server system. For a given ticket, the "set of ticket-indicated component(s)" will be inclusive of, and may be more numerous than, the "set of first-expression-indicated component(s)" because the set of ticket-indicated component(s) will include all component(s) indicated by the first expression, as well as any component(s) mentioned (or otherwise indicated by) the ticket other than the first expression portion.

Specifically, because the first expression describing the symptom is provided in the predetermined format described above, a natural language analysis or a text analysis may be performed on the current ticket, so as to find and extract the first expression within the larger text data of the current ticket. As mentioned above, the first expression describes symptom(s) of the incident to which the ticket relates. In the ticket shown in FIG. 3, the first expression is extracted as follows: "application A2 is down on middleware WAS." In this example, this first expression may found through: (i) formatting (for example, the first expression, and only the first expression, appears in a certain field in the ticket document); and/or (ii) more sophisticated methods of text analysis that rely on meaning to find the portion of the larger ticket data describing the symptom(s) of the incident. Because various methods for performing the natural language analysis or the text analysis is known in the art, a detailed description thereof will not be set forth here.

Additionally, because the list of the components making up the server system is stored in the CMDB, the name of each component may be retrieved from the list and then used as a keyword search the ticket data to determine the full "set of ticket-indicated component(s)" that are present in, and/or indicated by (for example, indicated by synonym), the text data of the ticket (including, but not necessarily limited to the text data of the first expression portion of the ticket that describes the symptom(s)).

If a given component of the server system is included in the set of ticket-indicated component(s), then some embodiments may consider that the given component has been determined to be one of the component(s) associated with the symptom. In searching the text of the ticket shown in FIG. 3, the list of search keywords corresponds to the list of components included in the server system, shown in FIG. 2, leads to the following keywords: "A1", "A2", "WAS", "DB2", "MQ", "S1", "S2" and "S3". In the example of searching the ticket of FIG. 3 using the keywords from FIG. 2, the search terms "A2" and "WAS" are found in the ticket text information, so that the two components "application A2" and "middleware WAS" are determined to be: (i) the set of ticket-indicated component(s); and (ii) the components associated with the symptom(s) of the incident that lead to the current ticket. In this way in this embodiment, the context information, which includes the first expression and indicates at least one component associated with the symptom, is extracted from the current ticket.

Continuing with FIG. 4, in step S402, a set of machine data source(s) is determined for each component of the set of ticket-indicated component(s). Each machine data source is a source of data written by machine logic (herein referred to as a "log") that pertains to operations of one, or more, components of the server system.

In some embodiments, the machine data source(s) corresponding to a given component (for example, a ticket-indicated component): (i) is not generated by the given component itself; but, rather (ii) is generated by a component related to the given component (sometimes herein referred to as a "related component") by a relationship present in a graph of the server system (for example, the server system graph of FIG. 2). In this case, the machine data source(s) for the given component will be, or at least include, the machine data source(s) of the related component.

Specifically, the relationship among the at least one component may be determined according to the information stored in the CMDB as described above. In the example shown in FIG. 3, the application A1 is installed in the middleware WAS. It is to be noted that, if only one component is indicated by the context information, the relationship may be determined as "one independent component" which shows that only one component exists, or the determination operation may be omitted. Then, the machine data model may be traversed to find at least one component which is the same as the at least one component and have the relationship in the model, as candidate components, and one of the candidate components may be selected as the machine data source. In the exemplary machine data model shown in FIG. 2, components "application A2" and "middleware WAS" in the branch "A2-WAS-S2" and components "application A2" and "middleware WAS" in the branch "A2-WAS-S3" are found by traversing the model, and the application A2 is installed in the middleware WAS in each of the branches, which is the same as the relationship among the components indicated by the context information. Therefore, components "application A2" and "middleware WAS" in the two branches may be determined as the candidate components. Then, the component acting as the machine data source may be selected from the candidate components. As an example, one of the candidate components may be selected as the machine data source. The selection may be performed in various manners. For example, a component which is logically at a lowest level in the candidate components may be selected as the machine data source. In the example shown in FIG. 2, since the middleware WAS is logically at a lower level than the application A2, the middleware WAS in either of the two branches may be selected as the source component. As another example, some of the candidate components may be selected as the machine data source. For example, both of the middleware WAS on the two branches may be selected as the machine data source(s). As yet another example, all of the candidate components may be selected as the machine data source(s).

In some embodiments, the context information extracted from the current ticket in Step S401 may be expanded by additional information indicating "a set of expansion component(s)." In these embodiments, machine data source(s) corresponding to both the ticket-indicated component(s) and the expansion component(s) are identified and searched, by machine logic, for information related to the incident. It is noted that if a component identified by additional information also happens to be a ticket-indicated component, then it will herein be referred to as a ticket-indicated component, rather than as an "expansion component."

Specifically, as shown in FIG. 2, there are often an application, a middleware and a server on a branch of the machine data model. However, the context information included in the current ticket does not necessarily indicate all components on the branch. For example, the context information included in the current ticket shown in FIG. 3 indicates only the application A2 and the middleware WAS, and does not indicate the server, which means the server is missing in the current ticket, rendering that more candidate components than it would be if the missing component was indicated in the ticket. In view of this, the context information extracted from the current ticket in Step S401 may be expanded, so that the missing component, if any, may be supplemented. Then the corresponding machine data source(s) may be determined based on the component indicated in the context information and the additional information indicating the missing component.

The additional information indicating the missing component (or "expansion component") may be extracted from a history ticket which is similar to the current ticket (called a similar history ticket hereinafter for simplicity). Briefly, the similar history ticket may be found from all history tickets generated for the server system, then the information on the component which appears in the similar history ticket but is not indicated in the context information extracted from the current ticket may be extracted from the similar history ticket as the additional information used to identify expansion component(s).

Specifically, the similar history ticket may be found in various manners. As an example, the similar history ticket may be a history ticket which belongs to a same topic as the current ticket. In this example, the current ticket and all the history tickets generated for the server system may be grouped and analyzed to determine their respective topics. For example, a statistic model such as a Latent Dirichlet Allocation model may be applied to analyze the topics of the tickets. Then, the history ticket which belongs to the same topic as the current ticket may be determined as the similar history ticket. A particular method for performing the topic analysis on the tickets is known in the art, thus a description thereof is omitted here for simplicity.

As another example, the similar history ticket may be a history ticket which has a similarity degree with the current ticket greater than a threshold. The threshold may be any suitable value set as needed. In this example, components mentioned in each history ticket and symptoms in each history ticket are extracted. Then, a similarity degree between the current ticket and each history ticket is evaluated based on the component and the symptom indicated in the context information extracted from the current ticket and the components and symptoms extracted from each history ticket.

Specifically, a vector may be created for each of the current ticket and the history tickets, where the number of elements of each vector is equal to a total number of different components and different symptoms included in the current ticket and the history tickets, and each element of the vector corresponds to one component or symptom, and a value of each element indicates whether the corresponding component or symptom exists in the current or history ticket. For example, a value of an element may be set to 1 indicating a corresponding component or symptom exists in the current or history ticket, or 0 indicating the corresponding component does not exist in the current or history ticket.

Then, a cosine value between the vector for each history ticket and the vector for the current ticket may be calculated as a similarity degree of the two tickets. If a similarity degree between a history ticket and the current ticket is greater than the threshold, the history ticket may be determined as the similar history ticket, otherwise the history ticket is not the similar history ticket.

Figure 5:
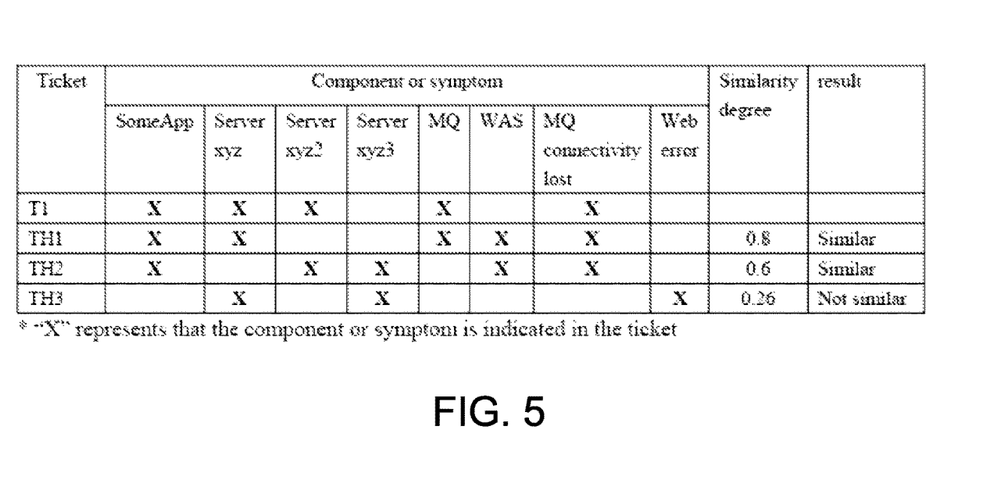
FIG. 5 shows schematically calculation results of several tickets according to an embodiment of the present disclosure.

The calculation of the similarity degree will be described in conjunction with an example shown in FIG. 5 hereinafter. Assume that the current ticket T1 indicates components "someAPP", "server xyz", "server xyz2" and "MQ" and a symptom "MQ connection is lost", a first history ticket TH1 indicates components "someAPP", "server xyz", "MQ", "WAS" and "MQ connection lost", a second history ticket TH2 indicates components "someAPP", "server xyz2", "server xyz3", "WAS" and "MQ connection lost", and a third history ticket TH3 indicates components "server xyz", "server xyz3", and "web error". Then, the vectors for the current ticket and the first to third history tickets may be represented as (1, 1, 1, 0, 1, 0, 1, 0), (1, 1, 0, 0, 1, 1, 1, 0), (1, 0, 1, 1, 0, 1, 1, 0), and (0, 1, 0, 1, 0, 0, 0, 1). Additionally, assume that the threshold is 0.5. Then, a cosine value between the vector of the current ticket and each history ticket is calculated as their similarity degree. In this example, the similarity degrees between the current ticket and the three history tickets are 0.8, 0.6 and 0.26. Then, the history ticket TH1 and the history ticket TH2 may be determined as the similar history tickets because their similarity degrees are greater than 0.5, whereas the history ticket TH3 is not the similar history ticket because its similarity degree is not greater than 0.5, as shown in FIG. 5. It is to be appreciated that the above method for calculating the similarity degree is illustrative, and other variant of the method may be used. For example, each component or symptom in the current or history ticket may be assigned a weight, indicating an influence of the component or symptom on the similarity degree, and the weight of the component or symptom may be multiplied to a value (for example 1 or 0) of an element corresponding to the component or symptom, so that the weight is taken into account when the similarity degree is calculated.

After the similar history ticket is found, the additional information indicating the missing component (or "expansion component") may be extracted from the similar history ticket. In some embodiments, all expansion component(s) of the set of expansion component(s) are used to find "expansion machine data source(s)." In other embodiments, the set of expansion component(s) is used selectively, such that not all expansion components of the set of expansion component(s) are used to search for expansion machine data sources to augment the machine data sources identified through use of the ticket-indicated components. For example, in case where there are a multiplicity of similar history tickets, only those components which are indicated in the similar history ticket but are not indicated by the context information and which appear in all the similar history tickets for a number times greater than a threshold may be determined as the missing components (that is, the "expansion components"). The threshold may be set to any suitable value as needed. In the example shown in FIG. 5, the component "server xyz3" appears in the two similar history tickets once, the component "WAS" appears in the two similar history tickets twice, and the component "web error" does not appear in the similar history tickets. If the threshold is 1, only the component "WAS" is determined as an expansion components to be used in identifying expansion machine data sources.

Then, the machine data source may be determined based on the component indicated in the context information extracted from the current ticket and the component indicated in the additional information extracted from the similar history ticket. In other words, both "ticket-indicated machine data sources" and "expansion machine data sources" may be automatically consulted, by machine logic, to derive relevant and/or useful information related to the incident. Briefly, relationship among the component indicated in the context information extracted from the current ticket and the component indicated in the additional information extracted from the similar history ticket may be determined firstly, and then the component in the server system matching the relationship may be determined as the machine data source. A particular method for determining the machine data source in this implementation is the same as that explained for the first implementation, and a detailed description thereof is omitted herein for simplicity.

Returning to FIG. 4, in step S403, the following are used as keywords to search for information related to the incident in the ticket-indicated log(s) and/or the expansion log(s): (i) the first expression describing the symptom included in context information extracted from the current ticket in step S401; and (ii) a second different expression describing the symptom.

Specifically, after the machine data source(s) are determined, all logs generated by the machine data source may be collected as target logs in which the information related to the incident may be searched for. Alternatively, logs generated within a predetermined time range before the time at which the current ticket is generated may be selected from all the logs generated by the machine data source, as target logs in which the information related to the incident may be searched for. The predetermined time range may be set according to actual needs, and may be for example several hours, several days, or the like. The time at which the current ticket may be known through the timestamp included in the current ticket as described above. Additionally, the predetermined time range may vary according to whether the current ticket is generated manually or generated by the server system automatically, this is because a time interval from the occurrence of the incident described by the current ticket to the generation of the current ticket if the current ticket is generated manually is often longer than that if the current ticket is generated by the server system automatically.

Then, the information related to the incident described by the current ticket may be searched for in the "target logs" (that is, the ticket-indicated log(s) and/or the expansion log(s)). In one implementation, the first expression describing the symptom in the context information may be used as a keyword to search for the information related to the incident in the target logs. However, if the current ticket is generated manually, since the logs are generated by the server system automatically, the expression used in the current ticket to describe a symptom may be different from the expression used in the logs to describe the symptom, even if the two expressions describe the same symptom. For example, if an incident occurs in the server system and thus a connection is not available, an expression describing a symptom in a ticket for the incident may be "connection is not available", whereas an expression used in a related log may be "error 404", and the two expressions are different, although they describe the same symptom. In view of this, in another implementation, the first expression describing the symptom included in context information extracted from the current ticket in step S401 and a second different expression describing the symptom may be used as keywords to search the relevant logs as determined by embodiments of the present invention. The "second expression" is herein defined to be any expression describing the symptom derived from any historical information related to any server system similar to the server system in which the incident has occurred. The historical information may be a root cause analysis (RCA) document related a historical incident in the server system, for example.

Specifically, for a history incident, an analysis was performed on a history ticket for this history incident and on related logs so as to find a cause for this history incident. Contents of the history ticket, contents of the related logs, a caused obtained through the analysis, and a solution to the history incident were recorded in the RCA document. As a result, an expression used in the ticket to describe a symptom of the history incident and an expression used in the logs to describe the symptom are present in the same RCA document and are related to the same symptom. Based on this fact, it is advisable to, for the current ticket, find the second expression from RCA documents generated previously.

A method for finding the second expression for the current ticket will be described below. As a preliminary operation, a text analysis may be performed on all or some of history logs to extract expression describing various symptoms. The extracted expressions may be stored as a dictionary (called expression dictionary below for convenience). For example, the expressions may include "http 404 error" which may be extracted form logs generated by an application, "CPU usage greater than 90%" which may be extracted form logs generated by a sever, and "deactivated" which may be extracted from logs generated by a middleware. The text analysis and the extraction may be performed in advance. To find the second expression, the RCA documents containing the first expression are selected from all RCA documents firstly. This selection may be performed by searching for the first expression in all the RCA documents. Then, the respective expressions in the expression dictionary may be searched for in the selected RCA documents to see whether these respective expressions exist in these selected RCA documents. If any of the expressions in the expression dictionary is found in selected RCA documents, the found expression may be determined as the second expression.

After the second expression is determined, the first expression and the second expression may be used as keywords to search for the information related to the incident in the target logs.

In this way, the information related to the incident may be found from the logs, so that a cause for the incident may be analyzed and corresponding measures may be taken. The information related to the incident found in the logs may be sorted in any suitable order so as to be displayed. For example, the information related to the incident may be sorted according to its relevance with the first expression and the second expression. The information related to the incident may also be sorted according to a time at which a log in which the information related to the incident is found is generated. For example, a first log generated at a time which is closer to the time at which the current ticket is generated is often more relevant to the symptom indicated in the current ticket than a second log generated at a time which is less closer to the time at which the current ticket is generated, thus the first log or the information related to the incident found in the first log may have a higher rank than the second log or the information related to the incident found in the second log.

With the above method, when the incident occurs in the server system, the information related to the incident may be found quickly, so that a cause of the incident may be found out and proper measures may be taken as soon as possible.

The respective embodiments for implementing the method of the present disclosure have been described with reference to the accompanying drawings hereinbefore. Those skilled in the art may understand that the above method may be implemented in software, in hardware, or in a combination thereof. Further, those skilled in the art may understand that by implementing the respective steps in the above method in software, in hardware, or in a combination thereof, a device for searching for information related to an incident generated in a server system based on the same inventive concept may be provided. Even if a hardware configuration of the device is the same as that of a general-purpose processing device, the device will exhibit characteristics different from the general-purpose processing device due to a function of software contained therein, so as to form the device according to the embodiment of the present disclosure. The device of the present disclosure includes a multiplicity of units or modules, which are configured to execute corresponding steps. Those skilled in the art may understand how to write a program to implement actions of the units or modules by reading the present specification.

Figure 6:
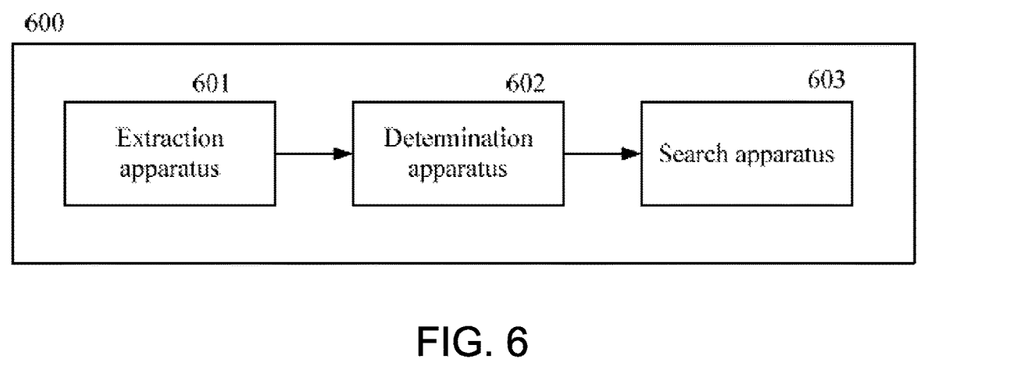
FIG. 6 shows a block diagram of a device for searching for information related to an incident generated in a server system according to an embodiment of the present disclosure.

With reference now to FIG. 6, the device for searching for information related to an incident generated in a server system according to an embodiment of the present disclosure will be described. Because the device and the method are based on the same inventive concept, the same or corresponding implementation details in the above method are also applicable to the device corresponding to the above method, and these implementation details will not be described below because they have been described in the above in detail.

As shown in FIG. 6, device 600 for searching for information related to an incident generated in a server system according to the embodiment of the present disclosure includes: extraction apparatus 601, determination apparatus 602, and search apparatus 603.

In this embodiment, determination apparatus 601 extracts context information from a current ticket describing the incident. As described above, the context information: (i) includes an expression describing a symptom of the incident (as noted above, this current-ticket-indicated symptom is herein referred to as the "first expression"); and (ii) indicates at least one "first-expression-indicated component" of the server system associated with the symptom. The first-expression-indicated component(s) may, or include, a server, a middleware and an application included in the server system.

Specifically, in this embodiment, determination apparatus 601 performs a natural language analysis or a text analysis on the current ticket, so as to find in the current ticket contents in the predetermined format as the first expression describing the symptom. Additionally, because the list of the components included in the server system is stored in the CMDB, the determination apparatus 601 may retrieve the names of the respective components and then use them as respective keywords to conduct searches in the current ticket. If a name of a certain component is found in the current ticket, the determination apparatus 601 determines the component to be the component associated with the symptom.

In this embodiment, determination apparatus 602 determines a machine data source which generates logs where the information related to the incident is to be searched for at least according to the at least one component indicated by the context information.

In a first implementation, determination apparatus 602 determines the machine data source according to the at least one component indicated by the context information. Briefly, determination apparatus 602 determines relationship(s) among the first-expression-indicated component(s) first, and then determines a "related component" in the server system which matches the relationship as the machine data source. It is to be noted that, if only one component is indicated by the context information, the determination apparatus 602 may determine the relationship as "one independent component" which shows that only one component exists, or may omit the determination operation.

In a second implementation, the determination apparatus 602 may expand the context information extracted from the current ticket by additional information indicating a component which is not indicated by the context information, then determine the machine data source according to the context information and the additional information.

The determination apparatus 602 may extract the additional information from a history ticket which is similar to the current ticket (called a similar history ticket hereinafter for simplicity). Specifically, the determination apparatus 602 may find the similar history ticket from all history tickets generated for the server system in the manner described above. As described above, the similar history ticket may be a history ticket which belongs to a same topic as the current ticket, or a history ticket which has a similarity degree with the current ticket greater than a threshold. The threshold may be any suitable value set as needed. Then, the determination apparatus 602 may extract, from the similar history ticket, the information on the component which appears in the similar history ticket but is not indicated in the context information extracted from the current ticket as the additional information.

Then, the determination apparatus 602 may determine the machine data source based on the component indicated in the context information extracted from the current ticket and the component indicated in the additional information extracted from the similar history ticket. Specifically, the determination apparatus 602 may determine relationship among the component indicated in the context information extracted from the current ticket and the component indicated in the additional information extracted from the similar history ticket firstly, and then determine the component in the server system matching the relationship as the machine data source.

The search apparatus 603 may use the first expression describing the symptom included in context information extracted from the current ticket and a second different expression describing the symptom as keywords to search for the information related to the incident in the logs generated by the machine data source determined by the determination apparatus 602.

Specifically, the search apparatus 603 may collect all logs generated by the machine data source as target logs in which the information related to the incident may be searched for. Alternatively, the search apparatus 603 may select logs generated within a predetermined time range before the time at which the current ticket is generated from all the logs generated by the machine data source, as target logs in which the information related to the incident may be searched for. The predetermined time range may be set according to actual needs, and may be for example several hours, several days, or the like. The time at which the current ticket may be known through the timestamp included in the current ticket as described above. Additionally, the predetermined time range may vary according to whether the current ticket is generated manually or generated by the server system automatically.

Then, the search apparatus 603 may search for the information related to the incident described by the current ticket in the target logs. In one implementation, the search apparatus 603 may use the first expression describing the symptom in the context information as a keyword to search for the information related to the incident in the target logs. Alternatively, the search apparatus 603 may use the first expression describing the symptom included in context information extracted from the current ticket and a second different expression describing the symptom as keywords. The second different expression may be an expression describing the symptom, which appears in a document created for a history incident, the document including the first expression and describing the symptom by using the second expression. The document may be a root cause analysis (RCA) document, for example. The search apparatus 603 may determine the second expression in the manner described above with reference to FIG. 3, and a detailed description thereof is omitted here to avoid repetition.

The search apparatus 603 may sort the information related to the incident found in the logs in any suitable order. For example, the information related to the incident may be sorted according to its relevance with the first expression and the second expression. The information related to the incident may also be sorted according to a time at which a log in which the information related to the incident is found is generated.

With the above device, when the incident occurs in the server system, the information related to the incident may be found quickly, so that a cause of the incident may be found out and proper measures may be taken as soon as possible.

It is to be appreciated that the embodiments described above are ideal, and various changes may be made thereto. For example, although the machine data are used when these embodiments are described, this is not limitative, and other data may be used if necessary.

The respective embodiments for implementing the method of the present disclosure have been described with reference to the accompanying drawings hereinbefore. Those skilled in the art may understand that the above method may be implemented in software, in hardware, or in a combination thereof. Further, those skilled in the art may understand that by implementing the respective steps in the above method in software, in hardware, or in a combination thereof, a device for searching for information related to an incident generated in a server system based on the same inventive concept may be provided. Even if a hardware configuration of the device is the same as that of a general-purpose processing device, the device will exhibit characteristics different from the general-purpose processing device due to a function of software contained therein, so as to form the device according to the embodiment of the present disclosure. The device of the present disclosure includes a multiplicity of units or modules, which are configured to execute corresponding steps. Those skilled in the art may understand how to write a program to implement actions of the units or modules by reading the present specification.

The present invention may be a system, a method, and/or a computer program product. The computer program product may include a computer readable storage medium (or media) having computer readable program instructions thereon for causing a processor to carry out aspects of the present invention. For example, a computer program product for searching for information related to an incident generated in a server system may include a computer readable storage medium having thereon first program instructions, second program instructions and third program instructions. The first program instructions are executable by a processor to cause the processor to extract context information from a current ticket describing the incident, the context information including a first expression describing a symptom of the incident and indicating at least one component of the server system associated with the symptom. The second program instructions are executable by the processor to cause the processor to determine a data source which generates data in which the information related to the incident is to be searched for at least according to the at least one component. The third program instructions are executable by the processor to cause the processor to use the first expression describing the symptom and a second different expression describing the symptom as keywords to search for the information related to the incident in the data. The at least one component includes at least one of a server, a middleware, and an application included in the server system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "similar server system" is hereby defined to collectively include: (i) the server system which is subject to a current ticket and a current incident, and/or (ii) a different server system which is similar to the server system subject to the current incident and the current ticket.

What is claimed is:

1. A method comprising:
receiving a machine data model (MDM) data set that includes information indicative of an MDM for a server system, the MDM including: (i) a plurality of server nodes of the server system, with each server node respectively including a set of server node name(s), (ii) a plurality of middleware nodes respectively running on the server nodes, with each middleware node respectively including a set of middleware node name(s), (iii) a plurality of applications respectively running on the middleware nodes or on the server nodes, with each application node respectively including a set of application node name(s), and (iv) a plurality of links among and between the server nodes, the middleware nodes and the application nodes;
receiving a ticket data set including information indicative of an operational incident that occurred with the server system, with the information indicative of the operational incident including unstructured text;
processing the unstructured text to determine a first ticket-indicated component, with the first ticket-indicated component corresponding to a first text string included in the unstructured text of the ticket that matches one of the following: (i) a server node name, (ii) a middleware node name, or (iii) an application node name;
analyzing the unstructured text by a Latent Dirichlet model to determine a topic of the ticket data set;
determining a first expansion component that is linked to the first ticket-indicated component by a link of the plurality of links in the MDM data set; and
determining a similar ticket data set based, at least in part, upon the first expansion component and the topic of the ticket data set.

2. The method of claim 1 wherein the determination of the similar ticket data set includes:
determining a vector characterizing the ticket data set;
for each given historical ticket data set of the plurality of historical ticket data set:
determining a vector characterizing the given historical ticket data set, and
determining a cosine value for the given historical data set, with the cosine value being the cosine between: (i) the vector characterizing the given historical ticket data set and (ii) the vector characterizing the ticket data set; and
determining the similar ticket data set as the historical ticket data set having the largest cosine value.

3. A computer program product (CPP) comprising:
a machine readable storage device; and
computer code stored on the machine readable storage device, with the computer code including instructions for causing a processor(s) set to perform operations including the following:
receiving a machine data model (MDM) data set that includes information indicative of an MDM for a server system, the MDM including: (i) a plurality of server nodes of the server system, with each server node respectively including a set of server node name(s), (ii) a plurality of middleware nodes respectively running on the server nodes, with each middleware node respectively including a set of middleware node name(s), (iii) a plurality of applications respectively running on the middleware nodes or on the server nodes, with each application node respectively including a set of application node name(s), and (iv) a plurality of links among and between the server nodes, the middleware nodes and the application nodes,
receiving a ticket data set including information indicative of an operational incident that occurred with the server system, with the information indicative of the operational incident including unstructured text,
processing the unstructured text to determine a first ticket-indicated component, with the first ticket-indicated component corresponding to a first text string included in the unstructured text of the ticket that matches one of the following: (i) a server node name, (ii) a middleware node name, or (iii) an application node name,
analyzing the unstructured text by a Latent Dirichlet model to determine a topic of the ticket data set,
determining a first expansion component that is linked to the first ticket-indicated component by a link of the plurality of links in the MDM data set, and
determining a similar ticket data set based, at least in part, upon the first expansion component and the topic of the ticket data set.

4. The CPP of claim 3 wherein the determination of the similar ticket data set includes:
determining a vector characterizing the ticket data set;
for each given historical ticket data set of the plurality of historical ticket data set:
determining a vector characterizing the given historical ticket data set, and
determining a cosine value for the given historical data set, with the cosine value being the cosine between: (i) the vector characterizing the given historical ticket data set and (ii) the vector characterizing the ticket data set; and
determining the similar ticket data set as the historical ticket data set having the largest cosine value.

5. A computer system (CS) comprising:
a processor(s) set;
a machine readable storage device; and computer code stored on the machine readable storage device, with the computer code including instructions for causing the processor(s) set to perform operations including the following:

receiving a machine data model (MDM) data set that includes information indicative of an MDM for a server system, the MDM including: (i) a plurality of server nodes of the server system, with each server node respectively including a set of server node name(s), (ii) a plurality of middleware nodes respectively running on the server nodes, with each middleware node respectively including a set of middleware node name(s), (iii) a plurality of applications respectively running on the middleware nodes or on the server nodes, with each application node respectively including a set of application node name(s), and (iv) a plurality of links among and between the server nodes, the middleware nodes and the application nodes, receiving a ticket data set including information indicative of an operational incident that occurred with the server system, with the information indicative of the operational incident including unstructured text, processing the unstructured text to determine a first ticket-indicated component, with the first ticket-indicated component corresponding to a first text string included in the unstructured text of the ticket that matches one of the following: (i) a server node name, (ii) a middleware node name, or (iii) an application node name, analyzing the unstructured text by a Latent Dirichlet model to determine a topic of the ticket data set, determining a first expansion component that is linked to the first ticket-indicated component by a link of the plurality of links in the MDM data set, and determining a similar ticket data set based, at least in part, upon the first expansion component and the topic of the ticket data set.

6. The CS of claim 5 wherein the determination of the similar ticket data set includes:

determining a vector characterizing the ticket data set;
for each given historical ticket data set of the plurality of historical ticket data set:
determining a vector characterizing the given historical ticket data set, and
determining a cosine value for the given historical data set, with the cosine value being the cosine between: (i) the vector characterizing the given historical ticket data set and (ii) the vector characterizing the ticket data set; and
determining the similar ticket data set as the historical ticket data set having the largest cosine value.

\* \* \* \* \*